United States Patent
Ding et al.

(10) Patent No.: US 10,489,885 B2
(45) Date of Patent: Nov. 26, 2019

(54) SYSTEM AND METHOD FOR STITCHING IMAGES

(71) Applicant: Shanghai Xiaoyi Technology Co., Ltd., Shanghai (CN)

(72) Inventors: Dajun Ding, Beijing (CN); Lili Zhao, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 77 days.

(21) Appl. No.: 15/921,646

(22) Filed: Mar. 14, 2018

(65) Prior Publication Data

US 2018/0268521 A1 Sep. 20, 2018

(30) Foreign Application Priority Data

Mar. 14, 2017 (CN) .......................... 2017 1 0149873

(51) Int. Cl.
*G06T 3/40* (2006.01)
*G06K 9/62* (2006.01)
*G06K 9/32* (2006.01)

(52) U.S. Cl.
CPC .......... *G06T 3/4038* (2013.01); *G06K 9/3233* (2013.01); *G06K 9/6202* (2013.01); *G06K 9/6212* (2013.01)

(58) Field of Classification Search
CPC .. G06T 3/4038; G06K 9/3233; G06K 9/6202; G06K 9/6212
See application file for complete search history.

(56) References Cited

U.S. PATENT DOCUMENTS

| | | | | |
|---|---|---|---|---|
| 5,987,164 A | * | 11/1999 | Szeliski | G06K 9/209 345/582 |
| 2011/0141300 A1 | * | 6/2011 | Stec | G06T 3/4038 348/222.1 |
| 2016/0044241 A1 | * | 2/2016 | Kaida | G06T 3/4038 348/36 |
| 2018/0060682 A1 | * | 3/2018 | Cho | G06K 9/00771 |

* cited by examiner

*Primary Examiner* — David F Dunphy
(74) *Attorney, Agent, or Firm* — Cantor Colburn LLP

(57) ABSTRACT

An image stitching method includes: obtaining a first and a second images; selecting a first and a second search regions from the first and second images, respectively, the first and second search regions at least partially overlapping with each other along a first direction; dividing each of the first and second search regions into a plurality of equally-sized pixel blocks; moving the first and second images toward each other along the first direction using the pixel blocks as a step size, until each of the first and second search regions has been traversed; after each movement, determining a pixel difference value representing a difference between all overlapping pixel blocks of the first search region and the second search region; determining an optimal block-matching position for the first and second images based on the pixel difference value; and stitching the first and second images according to the optimal block-matching position.

20 Claims, 6 Drawing Sheets

SYSTEM AND METHOD FOR STITCHING IMAGES

CROSS-REFERENCE TO RELATED APPLICATION

This application is based upon and claims priority from Chinese Patent Application No. 201710149873.2, filed on Mar. 14, 2017, the disclosure of which is expressly incorporated herein by reference in its entirety.

TECHNICAL FIELD

The present disclosure generally relates to image processing technology, and more specifically to a system and method for stitching images.

BACKGROUND

With social development and progress and falling hardware costs, surveillance cameras are increasingly and widely used by families as a front-end device for surveillance. When used, the surveillance camera is installed at a specific location, from where fixed-location surveillance can be carried out. The surveillance range of a regular camera is limited due to its limited field of view, which is inherent to the camera. A regular one-piece camera has a maximum view angle of approximately 60°; thus, it covers a very small area of surveillance. When the camera is designated to monitor a certain area, it may not be able to cover other areas, i.e. blind areas. With respect to the difficult problem of safety blind spots in video surveillance, the weaknesses of traditional cameras are understood, and it is hoped that 360° panoramic video information can be obtained. Among solutions that address this problem, the simplest is to install more cameras at the venue that is under surveillance, but obviously this increases the cost of surveillance tremendously. Wide-angle or even ultra-wide-angle fisheye cameras may also be employed; this type of camera features a large field of view and can monitor a larger area of the scene. However, with the increase in the area under surveillance, the clarity of details in the recorded images is not guaranteed, and small things may not be viewed clearly. Moreover, fisheye cameras have very large image distortion, distorting and deforming the images.

In order to address the trade-off between the field of view and clarity, two solutions have been created, i.e. the multi-lens stitching solution and the pan/tilt camera with wide-angle lens solution. Here, the multi-camera stitching solution comprises: a plurality of fixed cameras is used, with each camera pointing in a different direction, and images recorded by the plurality of cameras are stitched into a complete panoramic image based on the geometric relationship between their shooting directions and the computation of boundary connections between the images. The resulting images from the stitching demonstrate higher clarity compared to images taken by fisheye lenses. The pan/tilt camera with wide-angle camera head solution has been adopted for application by a large number of manufacturers due to the advantages it provides, including the relatively low cost of device hardware, the ease of control, etc.

However, with currently available technology, panoramic stitching algorithms for the multi-camera solution and the pan/tilt camera solution are highly complex and require a large amount of computation.

The disclosed methods and systems address one or more of the problems listed above.

SUMMARY

Consistent with one embodiment of the present disclosure, a method for stitching images is provided. The method may include: obtaining a first source image and a second source image; selecting a first search region from the first source image and a second search region from the second source image, the first search region and second search region at least partially overlapping with each other along a first direction; dividing each of the first and second search regions into a plurality of pixel blocks, the pixel blocks in the first and second search regions having equal sizes; moving the first source image and the second source image toward each other along the first direction using the pixel blocks as a step size, until each of the first and second search regions has been traversed; after each movement, determining a pixel difference value representing a difference between all overlapping pixel blocks of the first search region and the second search region; determining an optimal block-matching position for the first and second source images based on the pixel difference value; and stitching the first and second source images according to the block-matching optimal position.

Consistent with another embodiment of the present disclosure, an apparatus for stitching images is provided. The apparatus includes a memory and a processor. The memory stores instructions. The processor is configured to execute the instructions to: obtain a first source image and a second source image; select a first search region from the first source image and a second search region from the second source image, the first search region and second search region at least partially overlapping with each other along a first direction; divide each of the first and second search regions into a plurality of pixel blocks, the pixel blocks in the first and second search regions having equal sizes; move the first source image and the second source image toward each other along the first direction using the pixel blocks as a step size, until each of the first and second search regions has been traversed; after each movement, determine a pixel difference value representing a difference between all overlapping pixel blocks of the first search region and the second search region; determine an optimal block-matching position for the first and second source images based on the pixel difference value; and stitch the first and second source images according to the block-matching optimal position.

Consistent with yet another embodiment of the present disclosure, a non-transitory computer-readable storage medium is provided. The medium stores instructions that, when executed by a processor, cause the processor to perform a method for stitching images. The method may include: obtaining a first source image and a second source image; selecting a first search region from the first source image and a second search region from the second source image, the first search region and second search region at least partially overlapping with each other along a first direction; dividing each of the first and second search regions into a plurality of pixel blocks, the pixel blocks in the first and second search regions having equal sizes; moving the first source image and the second source image toward each other along the first direction using the pixel blocks as a step size, until each of the first and second search regions has been traversed; after each movement, determining a pixel difference value representing a difference between all overlapping pixel blocks of the first search region and the second search region; determining an optimal block-matching position for the first and second source images based on the pixel difference value; and stitching the first and second source images according to the block-matching optimal position.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

As mentioned in the Prior Art section, with currently available technology, panoramic stitching algorithms for the multi-camera solution and the pan/tilt camera solution are highly complex and require a large amount of computation.

In the technical solution provided by the present invention, when the images are being stitched, search regions are selected and divided into pixel blocks, then the first original image and the second original image are moved based on the pixel blocks and the pixel difference value is computed in order to determine the block-matching optimal position, and the first original image and the second original image are stitched at the block-matching optimal position. By forming pixel blocks, the accuracy of the matching position can be ensured and at the same time the amount of computation and the complexity are reduced when the optimal block-matching position is being determined.

In order to make the aforementioned purpose, characteristics, and advantages of the present invention more evident and easier to understand, detailed descriptions are provided below on specific embodiment examples of the present invention in reference to the drawings attached.

Figure 1:
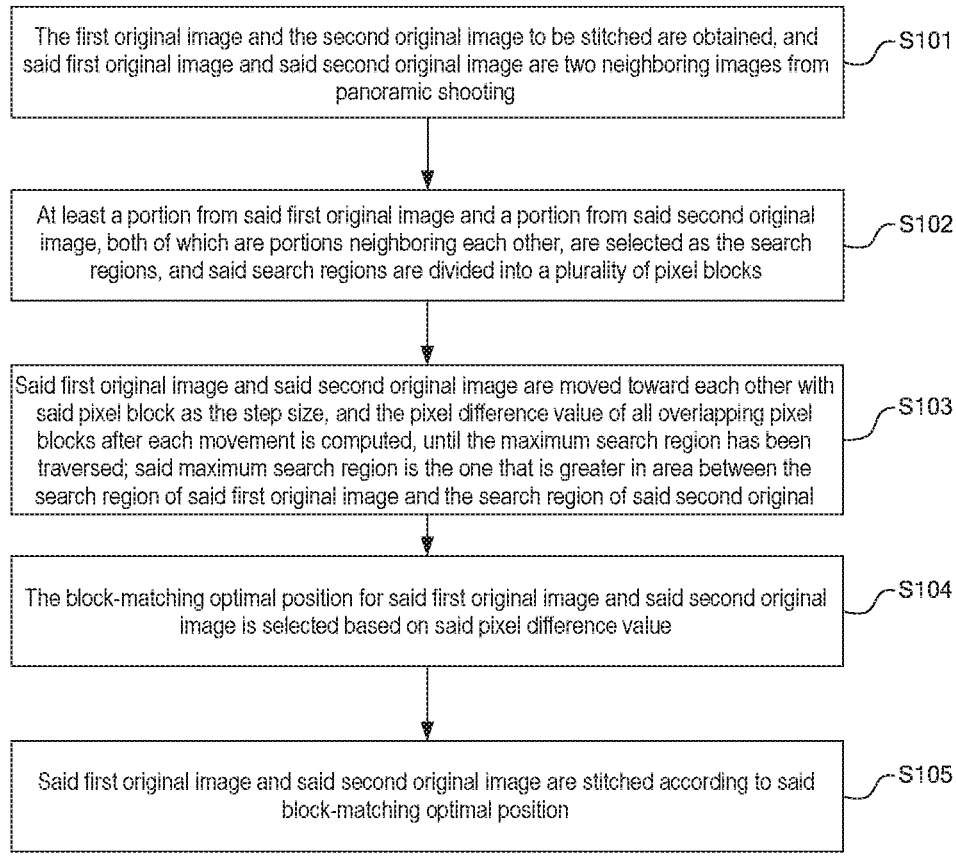
FIG. 1 is a flowchart of a method for stitching images, according to an exemplary embodiment of the present disclosure.

FIG. 1 is a flowchart of a method 100 for stitching images, according to an exemplary embodiment of the present disclosure. As shown in FIG. 1, the method 100 includes the following steps.

Step S101: the first original image and the second original image to be stitched are obtained, and the first original image and the second original image are two neighboring images from panoramic shooting;

Step S102: at least a portion from the first original image and a portion from the second original image, both of which are portions neighboring each other, are selected as the search regions, and the search regions are divided into a plurality of pixel blocks;

Step S103: the first original image and the second original image are moved toward each other with the pixel block as the step size, and the pixel difference value of all overlapping pixel blocks after each movement is computed, until the maximum search region has been traversed; the maximum search region is the one that is greater in area between the search region of the first original image and the search region of the second original image;

Step S104: the optimal block-matching position for the first original image and the second original image is selected based on the pixel difference value;

Step S105: the first original image and the second original image are stitched according to the block-matching optimal position.

In a specific embodiment, in step S101, the first original image and the second original image obtained may be two neighboring images from panoramic shooting. Specifically, a portion of what is photographed in the first original image and a portion of what is photographed the second original image are the same, and the stitching of the first original image and the second original image can be completed based on these same portions.

In actual application scenarios, the first source image and the second source image may be taken by a pan/tilt camera, a camera installed on a gimbal, a multi-lens camera, etc.

In a specific embodiment, the search regions need to be determined first in order to determine the stitching position for the first source image and the second source image. In step S102, at least a portion from the first source image and a portion from the second source image, both of which are portions neighboring each other, are selected as the search regions. Typically, regions near the stitching position for the first source image and the second source image (for example, the right region of the first source image and the left region of the second source image) are selected as the search regions. More specifically, the size of the search region in the first source image and the size of the search region in the second source image may be the same or different. The stitching position can be further determined through computation in the search regions. Here, the first source image and the second source image are stitched at the stitching position. Specifically, a 60% portion of the first source image may be selected as the search region in the first source image, and a 60% portion of the second source image may be selected as the search region in the second source image.

In currently available technology, the search for the stitching position is typically based on pixels directly, requiring a large amount of computation; however, in step S102, the search regions are divided into a plurality of pixel blocks, thus the search for the stitching position can be based on pixel blocks, which helps reduce the amount of computation. Specifically, the shape and size of each pixel block are the same; the shape and size of each pixel block can be configured according to the actual application scenario and are not restricted by this embodiment example. Specifically, the search regions may be rectangular areas in the first source image and the second source image, and the pixel blocks may be rectangular blocks.

Figure 2:
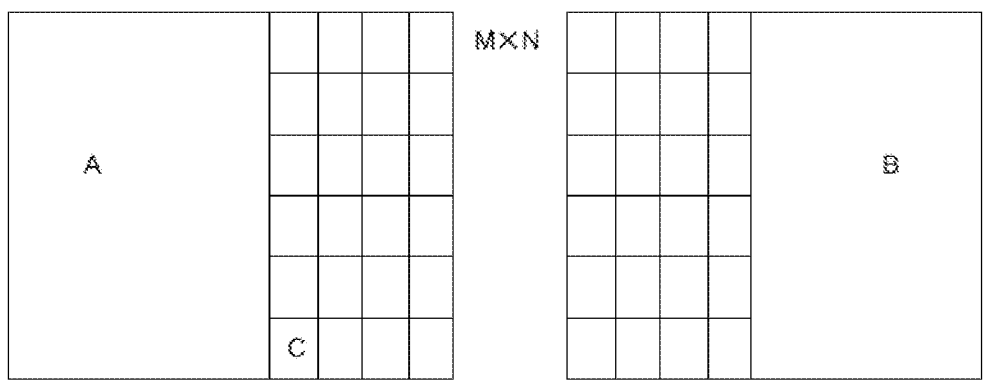
FIG. 2 is a schematic diagram illustrating two source images to be stitched, according to an exemplary embodiment of the present disclosure.

FIG. 2 is a diagram showing two source images to be stitched in one embodiment example of the present invention. In the embodiment example, the search regions in the first source image A and the second source image B are the same in size. Here, the gridded region in the first source image A indicates the search region in the first source image A, and this search region is divided into M×N pixel blocks C; similarly, the gridded region in the second source image B indicates the search region in the second source image B, and this search region is divided into M×N pixel blocks C. The pixel block C may comprise m×n pixels. Here, M, N, m, and n are all positive integers.

In a specific embodiment, in step S103, the search for the stitching position is conducted at the pixel block level for the first source image and the second source image; the first source image and the second source image are moved toward each other with the pixel block as the step size, and the pixel difference value of all overlapping pixel blocks after each movement is computed, until the maximum search region has been traversed. Specifically, in the search regions, the first source image or the second source image are moved with the pixel block as the step size; after each movement, there will be one more column of overlapping pixel blocks between the first source image and the second source image, and then the pixel difference value of all overlapping pixel blocks can be computed. Here, the pixel difference value can show the pixel difference between the overlapping pixel blocks in the first source image and the second source image; the smaller the pixel difference is, the better the outcome is for stitching at the overlapping pixel blocks for the first source image and the second source image.

Take FIG. 2 as an example. The first source image A is moved with the pixel block C as the step size. After the completion of the first movement, there is one column of overlapping pixel blocks between the first source image A and the second source image B; after the completion of the second movement, there are two columns of overlapping pixel blocks between the first source image A and the second source image B; and so on, after the completion of the Nth movement, the search regions in the first source image A and the second source image B completely overlap with each other, and there are N columns of overlapping pixel blocks. With N movements of the first source image A, N pixel difference values can be obtained.

In a specific embodiment, in step S104, the optimal block-matching position for the first source image and the second source image is selected based on the pixel difference value. Specifically, when the pixel difference value is at its minimum, all overlapping pixel blocks can be selected as the block-matching optimal position.

In a specific embodiment, in step S105, the first source image and the second source image are stitched according to the block-matching optimal position. Specifically, after determining the block-matching optimal position, the first source image and the second source image can be selected and stitched, respectively, on the two sides of the block-matching optimal position.

Persons skilled in the art should understand that a plurality of source images in the horizontal 360° range needs to be obtained if the stitching is for a panoramic image; each pair of neighboring source images can be considered as the first source image and the second source image, which are stitched following the steps shown in FIG. 1 in order to complete the stitching of the panoramic image.

In an embodiment example of the present invention for image stitching, when determining the block-matching optimal position, the accuracy of the matching position can be ensured and the amount of computation and the complexity can be reduced by forming pixel blocks.

Preferably, step S103 may comprise the following steps: the first source image and the second source image are moved toward each other along the row direction with the pixel block as the step size, and the block pixel difference values of all overlapping pixel blocks are averaged after each movement; the average value is used as the pixel difference value, and the block pixel difference value refers to the average value of all pixel values in the pixel block. Specifically, when computing the pixel difference value, the block pixel difference values are used; in other words, first the average value of all pixel values in the pixel block is computed as the block pixel difference value, and then the average value of the block pixel difference values of all overlapping pixel blocks is computed as the pixel difference value. By using the average value of all pixel values in the pixel block as the block pixel difference value, the amount of computation is further reduced compared to computing the difference value of all pixels in currently available technology.

Further, when the search regions in the first source image and the second source image are the same in size, the following formula can be used to compute the average value of the block pixel difference values:

$$Vb = \frac{\sum_{i=1}^{M} \sum_{j=1}^{N} (Lij - Rij) \times (Lij - Rij)}{n \times M};$$

here, Vb is the average value of the block pixel difference values, M is the number of rows of pixel blocks in the search regions, N is the number of columns of pixel blocks in the search regions, Lij is the average value of all pixel values in the pixel block at row i and column j of the first source image, Rij is the average value of all pixel values in the pixel block at row i and column j of the second source image, and n is the movement as measured by the number of pixel block columns.

Further, step S104 may comprise the following steps: when the average value of the block pixel difference values is at its minimum, the relative position of the first source image and second source image is taken as the block-matching optimal position. Specifically, after N movements, the search regions in the first source image and the second source image completely overlap; at this time N average values Vb of the block pixel difference values can be obtained, thus the minimum of the average values Vb of block pixel difference values can be selected, and the relative position of the first source image and the second source image corresponding to this minimum value is the block-matching optimal position.

Figure 3:
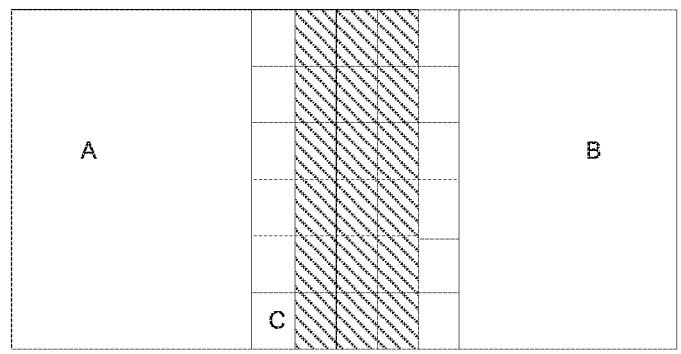
FIG. 3 is a schematic diagram illustrating two source images in their block-matching optimal position, according to an exemplary embodiment of the present disclosure.

Referring to FIG. 3 for the specifics, as a nonrestrictive example, n, which measures the movement in the number of columns, is 3 when the average value Vb of block pixel difference values is at its minimum; at this time, the first source image A and the second source image B have 3 columns of overlapping pixel blocks (shown as the shaded region in FIG. 3), and at this time the relative position of the first source image A and the second source image B is the block-matching optimal position.

Understandably, when the average value Vb of block pixel difference values is at its minimum, the position of the first source image A and the second source image B after the completion of the movement is the relative position of the first source image A and the second source image B. For example, the optimal block-matching position is the relative position of the first source image A and the second source image B after the first source image A has moved 3 columns of pixel blocks toward the second source image B. The optimal block-matching position may be denoted by any implementable means, which is not restricted by the embodiment example of the present invention.

Preferably, step S104 may comprise the following steps: the first source image and the second source image are moved toward each other along the row direction with the pixel as the step size in the block-matching optimal position, and the difference value of the pixel values of all overlapping pixels after each movement is computed; when the difference value of the pixel values is at its minimum, the relative position of the first source image and second source image is taken as the pixel-matching optimal position; the first source image and the second source image are stitched according to the pixel-matching optimal position.

In a specific embodiment, after determining the block-matching optimal position, the overlapping pixel blocks of the first source image and the second source image in the optimal block-matching position are taken as the search regions for pixel-level movement and computation, and each time the computation computes the difference value of the pixel values of all overlapping pixels between the first source image and the second source image.

Continuing to refer to FIG. 3, the pixel block C comprises m×n pixels, thus the search region comprises 6m×3n pixels. The first source image A is moved along the row direction toward the second source image B with the pixel as the step size. After the completion of the first movement, there is one column of overlapping pixels between the first source image A and the second source image B; after the completion of the second movement, there are two columns of overlapping pixels between the first source image A and the second source image B; and so on, after the completion of the 3nth movement, the search regions in the first source image A and the second source image B completely overlap with each other. By now, 3n pixel difference values can be obtained; when the difference value of the pixel values is at its minimum, the relative position of the first source image and second source image is selected as the pixel-matching optimal position.

Further, the following formula can be used to compute the difference value of the pixel values: $Vp=\sum_{x=1}^{H}\sum_{y=1}^{L}(Lxy-Rxy)\times(Lxy-Rxy)$;

here, Vp is the difference value of the pixel values; H is the number of rows of all overlapping pixels in the block-matching optimal position, L is the number of columns of all overlapping pixels in the block-matching optimal position, Lxy is the pixel value of the pixel at row i and column j of the first source image, and Rxy is the pixel value of the pixel at row i and column j of the second source image.

Figure 4:
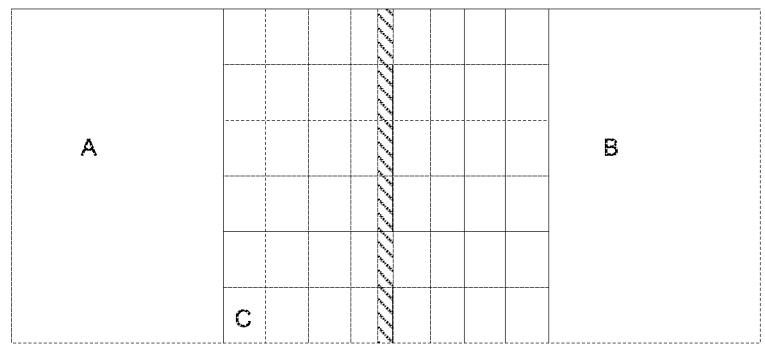
FIG. 4 is a schematic diagram illustrating two source images in their pixel-matching optimal position, according to an exemplary embodiment of the present disclosure.

FIG. 4 is a diagram showing a pixel-matching optimal position in one embodiment example of the present invention. When the difference value Vp of the pixel values is at its minimum, the number of columns of all overlapping pixels is m/3 (here, m is a positive integer multiple of 3); at this time, the first source image A and the second source image B have m/3 columns of overlapping pixels (shown as the shaded region in FIG. 4), and at this time the relative position of the first source image A and the second source image B is the pixel-matching optimal position.

In the embodiment example of the present invention, after determining the block-matching optimal position, pixel-level movement and computation are carried out in the optimal block-matching position in order to determine the pixel-matching optimal position, which further ensures the accuracy of the matching position; compared to searching for the stitching position directly at the pixel level in currently available technology, in this example the amount of computation is smaller and the complexity is lower.

Preferably, after step S101, the following steps may be included: a cylindrical projection is performed on the first source image and the second source image in order to obtain the projected images of the first source image and the second source image. Specifically, images taken by pan/tilt cameras share certain characteristics because pan/tilt cameras rotate horizontally when capturing the images, and a cylindrical projection has a limited degree of freedom in the up-down tilt, i.e. a ring-shaped image can result from the stitching in the horizontal direction. The use of a cylindrical projection can ensure stitching accuracy.

Further, a cylindrical projection may be performed on the first source image and the second source image based on the pre-obtained shooting angles for the first source image and the second source image. Specifically, the pan/tilt camera can obtain the camera's angles of elevation at the times of shooting, and these angles of elevation are the shooting angles for the first source image and the second source image. With these known shooting angles as inputs, there is no need to compute the camera's external rotation matrix and projection matrix separately, and the projective transformation can be performed with a fixed transformation matrix that is selected based on the shooting angles of the first source image and the second source image; thus, the computation time may be significantly reduced. More specifically, after the transformation, objects in the first source image and the second source image are perpendicular to the ground, so as to facilitate horizontal movement and stitching later on.

Figure 5:
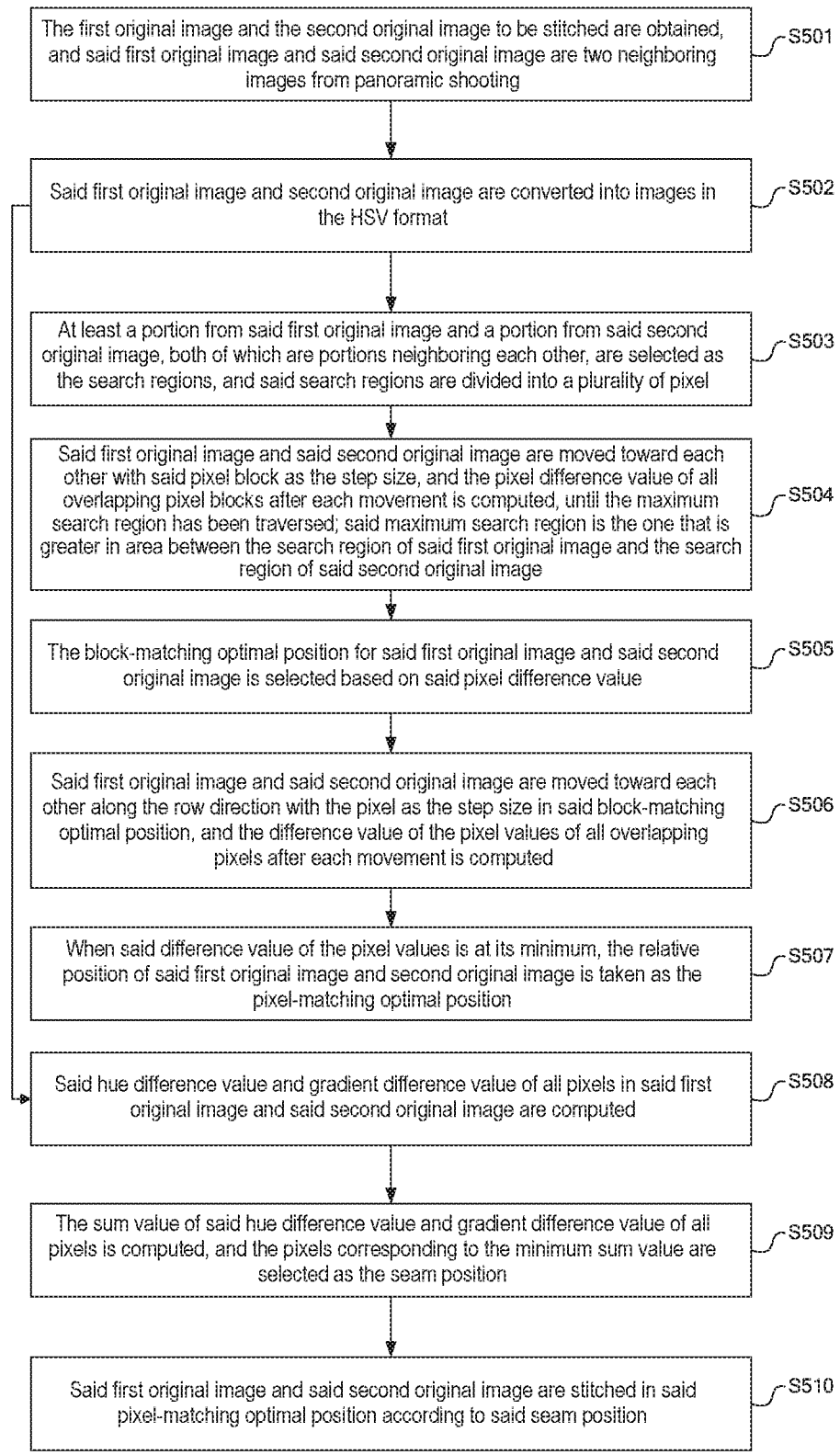
FIG. 5 is a flowchart of a method for stitching images, according to an exemplary embodiment of the present disclosure.

FIG. 5 is a flowchart of a method 500 for stitching images, according to an exemplary embodiment of the present disclosure. As shown in FIG. 5, the method 500 includes the following steps.

In step S501, the first source image and the second source image to be stitched are obtained. Please see the relevant descriptions of step S101 shown in FIG. 1 for specific embodiments of step S501; no redundant description will be detailed here.

In step S502, the first source image and second source image are converted into images in the HSV format. Here, in the HSV format, H, S, and V stand for hue, saturation, and value, respectively. Specifically, the first source image and the second source image are typically RGB images; thus, when the pixel difference value is being computed, the difference values in the R channel, G channel, and B channel of the first source image and the second source image need to be computed separately, requiring a large amount of computation. However, the inventor of the present application has discovered that for the obtained source images, the difference in saturation and value is not large, while the difference in hue is relatively large. Therefore, RGB images can be converted into HSV images, so that the amount of computation for image stitching may be further reduced because it is possible to compute the difference value in hue only when the pixel difference value is computed in later steps.

Optionally, the first source image and second source image may be converted to images in the YUV format, i.e. the YCrCb format. Here, Y stands for luminance or luma, and U and V stand for chrominance or chroma. Thus, the amount of computation for image stitching may be further reduced because it is possible to compute the chrominance difference value only when the pixel difference value is computed in later steps.

In step S503, at least a portion from the first source image and a portion from the second source image, both of which are portions neighboring each other, are selected as the search regions, and the search regions are divided into a plurality of pixel blocks.

In step S504, the first source image and the second source image are moved toward each other with the pixel block as the step size, and the pixel difference value of all overlapping pixel blocks after each movement is computed, until the maximum search region has been traversed; the maximum search region is the one that is greater in area between the search region of the first source image and the search region of the second source image.

In step S505, the optimal block-matching position for the first source image and the second source image is selected based on the pixel difference value.

In step S506, the first source image and the second source image are moved toward each other along the row direction with the pixel as the step size in the block-matching optimal position, and the difference value of the pixel values of all overlapping pixels after each movement is computed.

In step S507, when the difference value of the pixel values is at its minimum, the relative position of the first source image and second source image is taken as the pixel-matching optimal position.

In this embodiment example, please see the relevant descriptions of the embodiment example shown in FIG. 1 for specific embodiments of steps S503 through S507; no redundant description will be detailed here.

In step S508, the hue difference value and the gradient difference value of all pixels in the first source image and the second source image are computed. In step S509, the sum value of the hue difference value and gradient difference value of all pixels is computed, and the pixels corresponding to the minimum sum value are selected as the seam position.

Specifically, after determining the pixel-matching optimal position, the stitching regions in the first source image and the second source image can be determined respectively. Given the principle of camera disparity, objects farther away from the camera appear smaller while objects closer to the camera appear larger; since objects in images captured by a pan/tilt camera are at various distances, when the first source image and the second source image include the same two objects, of which one is farther and the other is closer, using the pixel-matching optimal position directly for stitching will lead to double images; thus, the seam position needs to be further determined for the stitching. Therefore, after the images have been converted to HSV images, the seam position for stitching the first source image and the second source image can be determined by using the differences in the hue values and the gradient values of all pixels in the first source image and the second source image.

Understandably, at least a portion of the seam position is located in the pixel overlapping region in the pixel-matching optimal position between the first source image and the second source image.

Further, the following formula can be used to compute the sum value: $Vs=\Sigma_{x=1}^{h}\Sigma_{y=1}^{l}(Lhxy-Rhxy)\times(Lhxy-Rhxy)+\Sigma_{x=1}^{h}\Sigma_{y=1}^{l}(Lgxy-Rgxy)\times(Lgxy-Rgxy)$;

here, Vs is the sum value of the hue difference value and the gradient difference value; h is the number of rows of pixels in the first source image and the second source image, l is the number of columns of pixels in the first source image and the second source image, Lhxy is the hue value of the pixel at row x and column y of the first source image, Rhxy is the hue value of the pixel at row x and column y of the second source image, Lgxy is the gradient value of the pixel at row x and column y of the first source image, and Rgxy is the gradient value of the pixel at row x and column y of the second source image.

Preferably, the following may be included before step S508: a downsampling operation is performed on the first source image and the second source image. Specifically, through the downsampling operation, the first source image and the second source image can be reduced in size; thus, the amount of computation can be reduced and the speed of computation can be increased later on when the hue difference value and the gradient difference value at the pixel level are computed. For example, the size of the first source image and the second source image is 1280×960 pixels, and the image size becomes 640×480 pixels after the downsampling operation.

In step S510, the first source image and the second source image are stitched in the pixel-matching optimal position according to the seam position.

Further, step S510 may comprise the following steps: in the regions between the seam position and the pixel-matching optimal position, pixels corresponding to the first source image and the second source image, respectively, are selected for the stitching; along the seam position, linear blending is used to stitch pixels corresponding to the first source image and the second source image, in order to complete the stitching of the first source image and the second source image. In other words, stitching the first source image and the second source image directly at the pixel-matching optimal position may lead to double images; in order to improve the stitching outcome, the seam position is taken as the boundary, and on both sides of the seam position, pixels corresponding to the first source image and the second source image, respectively, are selected for the stitching. In addition, the seam position typically includes a plurality of pixels, and linear blending may be used to stitch the plurality of pixels along the seam position.

Persons skilled in the art should understand that the linear blending may be realized by any implementable means, which is not restricted by the embodiment example.

A difference in lighting at the times of shooting results in a difference in luminance in the first source image and the second source image; therefore, exposure compensation is needed before the stitching so that the first source image and the second source image after stitching have a more natural luminance transition at the stitching position, which improves the stitching outcome.

Preferably, the following steps may be included before step S510: the format of the first source image and the second source image is converted to YCrCb; after the format conversion, the average of luminance values in the first source image and the second source image at the seam position is computed with samples; the luminance average value is used to compute a plurality of exposure factors in the pixel-matching optimal position between the first source image and the second source image; the plurality of exposure factors is used for exposure compensation for the first source image and the second source image, in order to balance the change in luminance in the pixel-matching optimal position between the first source image and the second source image.

In a specific embodiment, first, the first source image and the second source image are converted to luminance images, and the luminance images may be YCrCb images or HSV images. Next, in order to reduce the amount of computation, the luminance average value at the seam position between the first source image and the second source image is computed with samples. With the luminance average value at the seam position as well as the luminance values of the first source image and the second source image, a plurality of exposure factors can be obtained and used for exposure compensation for the overlapping pixels in the pixel-matching optimal position between the first source image and the second source image. For example, the luminance average value is 75 at the seam position between the first source image and the second source image, the luminance value of the first source image is 50, and the luminance value of the second source image is 100; after compensation with the computed exposure factors, the luminance value from the pixel-matching optimal position to the seam position can be gradually transitioned in the first source image, increasing from 50 to 75; similarly, the luminance value from the pixel-matching optimal position to the seam position can be gradually transitioned in the second source image, decreasing from 100 to 75.

Figure 6:
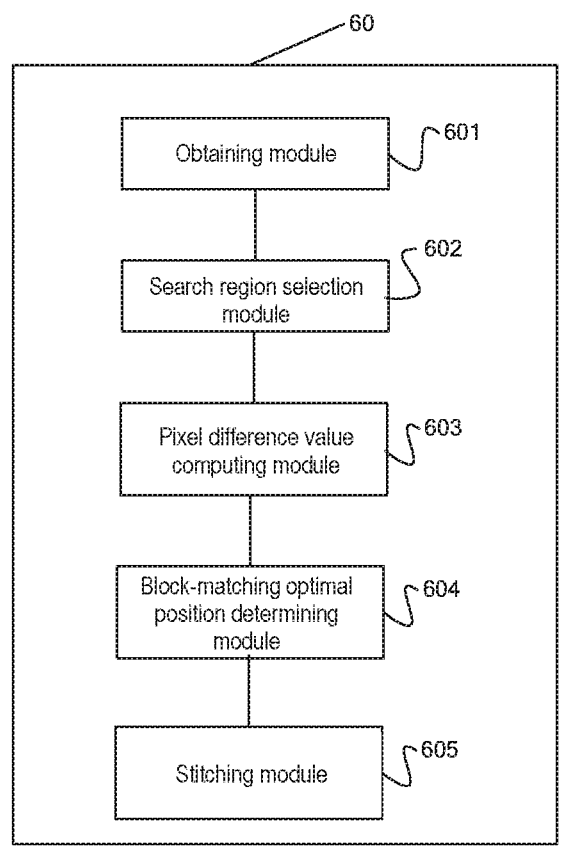
FIG. 6 is a block diagram of a device for stitching images, according to an exemplary embodiment of the present disclosure.

FIG. 6 is a structural diagram showing an image stitching apparatus in one embodiment example of the present invention.

The image stitching apparatus 60 shown in FIG. 6 may comprise: an obtaining module 601, a search region selection module 602, a pixel difference value computing module 603, an optimal block-matching position determining module 604, and a stitching module 605.

Here, the obtaining module 601 is suitable for obtaining the first source image and the second source image to be stitched, and the first source image and the second source image are two neighboring images from panoramic shooting.

The search region selection module 602 is suitable for selecting at least a portion from the first source image and a portion from the second source image, both of which are portions neighboring each other, as the search regions, and for dividing the search regions into a plurality of pixel blocks.

The pixel difference value computing module 603 is suitable for moving the first source image and the second source image toward each other with the pixel block as the step size, and for computing the pixel difference value of all overlapping pixel blocks after each movement, until the maximum search region has been traversed; the maximum search region is the one that is greater in area between the search region of the first source image and the search region of the second source image.

The optimal block-matching position determining module 604 is suitable for selecting the optimal block-matching position for the first source image and the second source image based on the pixel difference value.

The stitching module 605 is suitable for stitching the first source image and the second source image according to the block-matching optimal position.

In the embodiment example, by forming pixel blocks, the accuracy of the matching position can be ensured and at the same time the amount of computation and the complexity are reduced when the optimal block-matching position is being determined.

Preferably, the pixel difference value computing module 603 moves the first source image and the second source image toward each other along the row direction with the pixel block as the step size, and averages the block pixel difference values of all overlapping pixel blocks after each movement; the average value is used as the pixel difference value, and the block pixel difference value refers to the average value of all pixel values in the pixel block.

Further, when the search regions in the first source image and the second source image are the same in size, the pixel difference value computing module 603 can use the following formula to compute the average value of the block pixel difference values:

$$Vb = \frac{\sum_{i=1}^{M} \sum_{j=1}^{N} (Lij - Rij) \times (Lij - Rij)}{n \times M};$$

here, Vb is the average value of the block pixel difference values, M is the number of rows of pixel blocks in the search regions, N is the number of columns of pixel blocks in the search regions, Lij is the average value of all pixel values in the pixel block at row i and column j of the first source image, Rij is the average value of all pixel values in the pixel block at row i and column j of the second source image, and n is the movement as measured by the number of pixel block columns.

Preferably, when the average value of the block pixel difference values is at its minimum, the optimal block-matching position determining module 604 takes the relative position of the first source image and second source image as the block-matching optimal position.

In the embodiment example of the present invention, after determining the block-matching optimal position, pixel-level movement and computation are carried out in the optimal block-matching position in order to determine the pixel-matching optimal position, which further ensures the accuracy of the matching position; compared to searching for the stitching position directly at the pixel level in currently available technology, in this example the amount of computation is smaller and the complexity is lower.

Please refer to the relevant descriptions in FIGS. 1 through 5 for more information on the principles and ways of operating for the image stitching apparatus 60; no redundant description will be detailed here.

Figure 7:
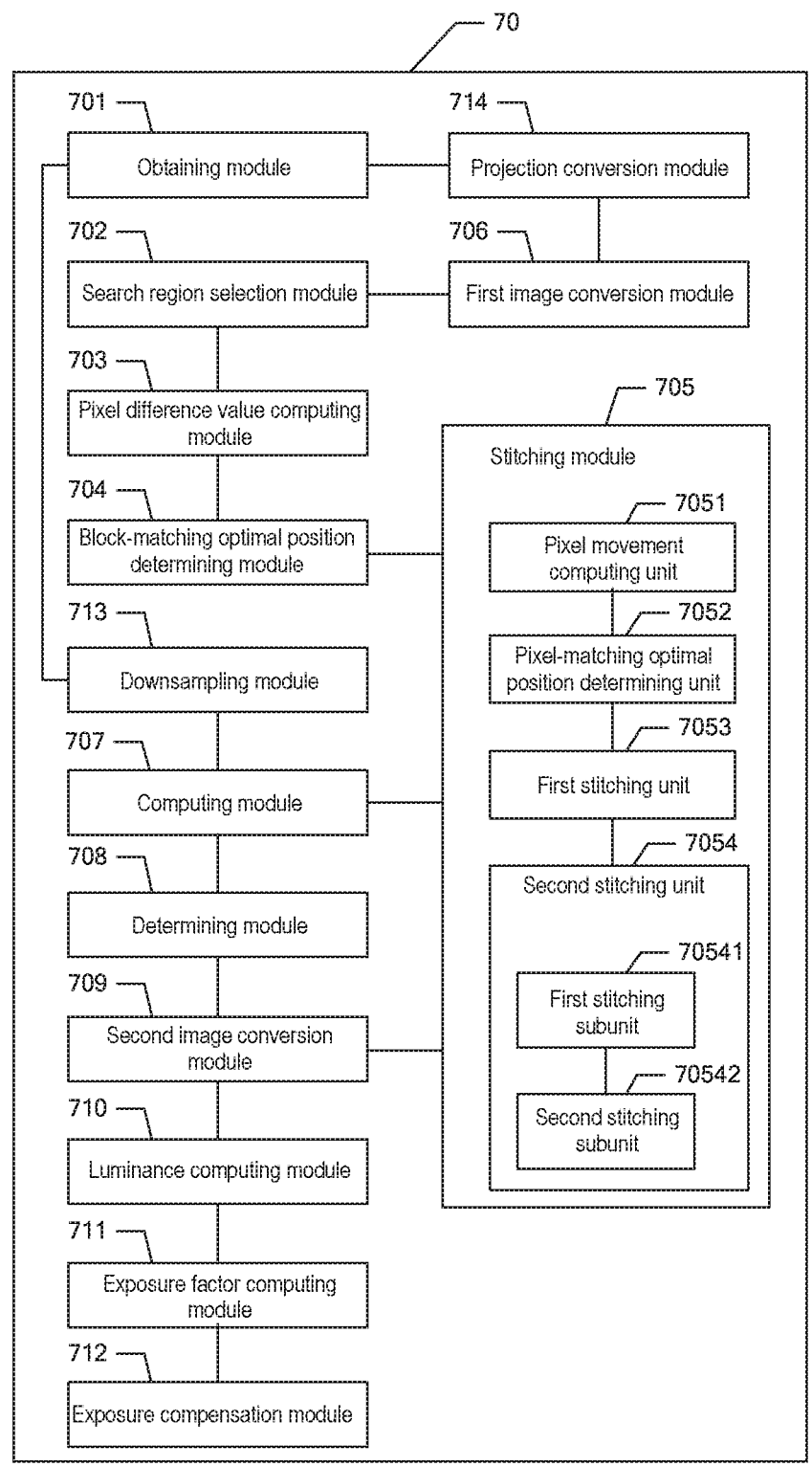
FIG. 7 is a block diagram of a device for stitching images, according to an exemplary embodiment of the present disclosure.

FIG. 7 is a structural diagram showing another image stitching apparatus in one embodiment example of the present invention.

The image stitching apparatus 70 shown in FIG. 7 may comprise: an obtaining module 701, a search region selection module 702, a pixel difference value computing module 703, an optimal block-matching position determining module 704, and a stitching module 705.

The stitching module 705 may comprise a pixel movement computing unit 7051, a pixel-matching optimal position determining unit 7052, and a first stitching unit 7053.

Here, the pixel movement computing unit 7051 is suitable for moving the first source image and the second source image toward each other along the row direction with the pixel as the step size in the block-matching optimal position, and for computing the difference value of the pixel values of all overlapping pixels after each movement; the pixel-matching optimal position determining unit 7052 is suitable for taking the relative position of the first source image and second source image as the pixel-matching optimal position when the difference value of the pixel values is at its minimum; the first stitching unit 7053 is suitable for stitching the first source image and the second source image according to the pixel-matching optimal position.

Further, the pixel movement computing unit 7051 can use the following formula to compute the difference value of the pixel values:

$$Vp = \sum_{x=1}^{H} \sum_{y=1}^{L} (Lxy - Rxy) \times (Lxy - Rxy);$$

here, Vp is the difference value of the pixel values; H is the number of rows of all overlapping pixels in the block-matching optimal position, L is the number of columns of all overlapping pixels in the block-matching optimal position, Lxy is the pixel value of the pixel at row x and column y of the first source image, and Rxy is the pixel value of the pixel at row x and column y of the second source image.

Preferably, the image stitching apparatus 70 shown in FIG. 7 may further comprise a first image conversion module 706. The first image conversion module 706 is suitable for converting the first source image and second source image into images in the HSV format, and the pixel difference value is the hue difference value.

Preferably, the image stitching apparatus 70 shown in FIG. 7 may further comprise a computing module 707 and a seam position determining module 708. The computing module 707 is suitable for computing the hue difference value and the gradient difference value of all pixels in the first source image and the second source image; the seam position determining module 708 is suitable for computing the sum value of the hue difference value and gradient difference value of all pixels and for selecting the pixels corresponding to the minimum sum value as the stitching position.

Further, the stitching module 705 may comprise a second stitching unit 7054. The second stitching unit 7054 is suitable for stitching the first source image and the second source image in the pixel-matching optimal position according to the seam position.

Further, the second stitching unit 7054 may comprise a first stitching subunit 70541 and a second stitching subunit 70542. The first stitching subunit 70541 is suitable for selecting pixels corresponding to the first source image and the second source image, respectively, in the regions between the seam position and the pixel-matching optimal position for the stitching; the second stitching subunit 70542 is suitable for using linear blending to stitch pixels corresponding to the first source image and the second source image along the seam position, in order to complete the stitching of the first source image and the second source image.

Preferably, the image stitching apparatus 70 shown in FIG. 7 may further comprise a second image conversion module 709, a luminance computing module 710, an exposure factor computing module 711, and an exposure compensation module 712. The second image conversion module 709 is suitable for converting the format of the first source image and the second source image to YCrCb; the luminance computing module 710 is suitable for computing with samples the average of luminance values in the first source image and the second source image at the seam position after the format conversion; the exposure factor computing module 711 is suitable for using the luminance average value to compute a plurality of exposure factors in the pixel-matching optimal position between the first source image and the second source image; the exposure compensation module 712 is suitable for using the plurality of exposure factors for exposure compensation for the first source image and the second source image, in order to balance the change in luminance in the pixel-matching optimal position between the first source image and the second source image.

Preferably, the image stitching apparatus 70 shown in FIG. 7 may further comprise a downsampling module 713; the downsampling module 713 is suitable for performing a downsampling operation on the first source image and the second source image.

Preferably, the image stitching apparatus 70 shown in FIG. 7 may further comprise a projection conversion module 714; the projection conversion module 714 is suitable for performing a cylindrical projection on the first source image and the second source image in order to obtain the projected images of the first source image and the second source image.

Further, the projection conversion module 714 may perform a cylindrical projection on the first source image and the second source image based on the pre-obtained shooting angles for the first source image and the second source image.

Please refer to the relevant descriptions in FIGS. 1 through 6 for more information on the principles and ways of operating for the image stitching apparatus 70; no redundant description will be detailed here.

An embodiment example of the present invention also discloses a terminal, and the terminal comprises the image stitching apparatus 60 shown in FIG. 6 or the image stitching apparatus 70 shown in FIG. 7. The image stitching apparatus 60 or the image stitching apparatus 70 may be internally integrated into or externally coupled to the terminal, so that the terminal can execute the steps shown in FIG. 1 or FIG. 5. Specifically, the terminal includes but is not limited to devices such as cell phones, tablets, computers, etc.

Figure 8:
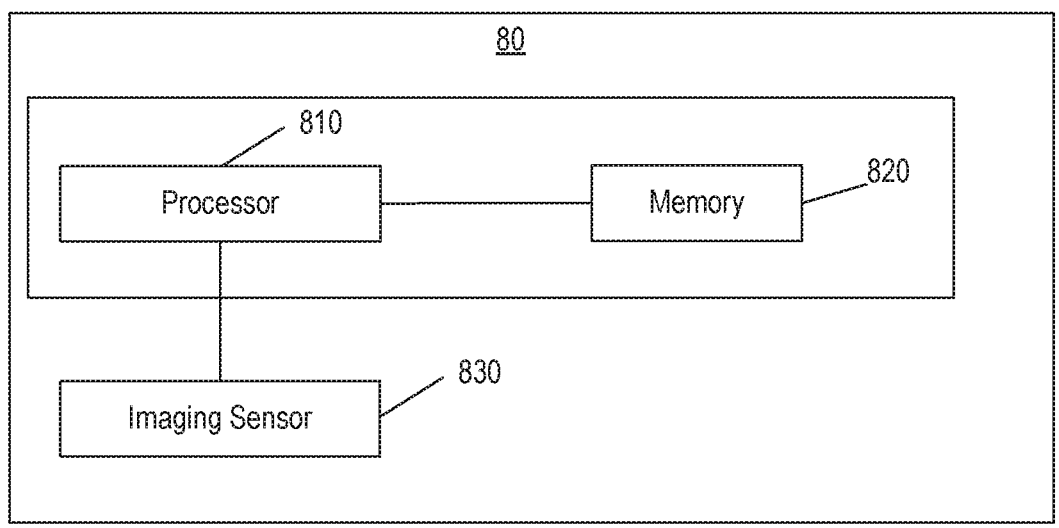
FIG. 8 is a block diagram of an image processing device, according to an exemplary embodiment of the present disclosure.

FIG. 8 is a block diagram of an image processing device 80, according to an exemplary embodiment of the present disclosure. As shown in FIG. 8, the image processing device 80 includes a processor 810 and a memory 820.

The memory 820 is configured to store instructions executable by the processor 810. The processor 810 is configured to execute the instructions to: obtain a first source image and a second source image; select a first search region from the first source image and a second search region from the second source image, the first search region and second search region at least partially overlapping with each other along a first direction; divide each of the first and second search regions into a plurality of pixel blocks, the pixel blocks in the first and second search regions having equal sizes; move the first source image and the second source image toward each other along the first direction using the pixel blocks as a step size, until each of the first and second search regions has been traversed; after each movement, determine a pixel difference value representing a difference between all overlapping pixel blocks of the first search region and the second search region; determine an optimal block-matching position for the first and second source images based on the pixel difference value; and stitch the first and second source images according to the block-matching optimal position. Details regarding the operation of the processor 810 can be referred to the above method embodiments, which are not repeated herein.

The image processing device 80 may also include one or more imaging sensors 830 configured to acquire images of a scene, such as images that can be combined to form a 360° panoramic image. The imaging sensor 830 may be a charge-coupled device (CCD) sensor or a complementary metal-oxide-semiconductor (CMOS) sensor. The imaging sensor 830 may also include any of optical devices, lens, CCD or CMOS driving circuitry, and other arrangements of optical components, electronic components, and control circuitry used in transmitting and receiving light of various wavelengths.

In example embodiments, the present disclosure also provides a non-transitory computer-readable storage medium including instructions. These instructions may be executed by a processor, such as the processor 810, to perform the methods described above. For example, the non-transitory computer-readable storage medium may be a read-only memory (ROM), a random access memory (RAM), a CD-ROM, a magnetic tape, a floppy disk, an optical data storage device, etc.

Notwithstanding the above disclosure of the present invention, it does not restrict the present invention. Any person of skill in the art may make various alterations and changes that are not detached from the spirit and scope of the present invention; therefore, the scope of protection for the present invention should be that as defined by the claims.

What is claimed is:

1. An image stitching method, comprising:
obtaining a first source image and a second source image;
selecting a first search region from the first source image and a second search region from the second source image, the first search region and second search region at least partially overlapping with each other along a first direction;
dividing each of the first and second search regions into a plurality of pixel blocks, the pixel blocks in the first and second search regions having equal sizes;
moving the first source image and the second source image toward each other along the first direction using the pixel blocks as a step size, until each of the first and second search regions has been traversed;
after each movement, determining a pixel difference value representing a difference between all overlapping pixel blocks of the first search region and the second search region;
determining an optimal block-matching position for the first and second source images based on the pixel difference value; and
stitching the first and second source images according to the block-matching optimal position.

2. The method according to claim 1, further comprising:
moving the first source image and the second source image toward each other along a row direction of the pixel blocks;
after each movement, determining the pixel difference value by averaging block pixel difference values of all overlapping pixel blocks, each of the block pixel difference value being a difference between average pixel values of two overlapping pixel blocks.

3. The method according to claim 2, wherein when the first and second search regions have equal sizes, the following formula is used to compute the average value of the block pixel difference values:

$$Vb = \frac{\sum_{i=1}^{M}\sum_{j=1}^{N}(Lij - Rij) \times (Lij - Rij)}{n \times M};$$

wherein Vb is the average value of the block pixel difference values, M is the number of rows of pixel blocks in the search regions, N is the number of columns of pixel blocks in the search regions, Lij is the average value of all pixel values in the pixel block at row i and column j of the first source image, Rij is the average value of all pixel values in the pixel block at row i and column j of the second source image, and n is the movement as measured by the number of pixel block columns.

4. The method according to claim 2, wherein the selection of the optimal block-matching position for the first source image and the second source image based on the pixel difference value comprises:
when the average value of the block pixel difference values is at its minimum, determining the relative position of the first source image and second source image as the block-matching optimal position.

5. The method according to claim 2, wherein the stitching of the first source image and the second source image according to the optimal block-matching position comprises:
moving the first source image and the second source image toward each other along the row direction with the pixel as the step size in the block-matching optimal position, and computing the difference value of the pixel values of all overlapping pixels after each movement;
when the difference value of the pixel values is at its minimum, determining the relative position of the first source image and second source image as the pixel-matching optimal position; and
stitching the first source image and the second source image according to the pixel-matching optimal position.

6. The method according to claim 5, wherein the following formula is used to compute the difference value of the pixel values:

$$Vp = \sum_{x=1}^{H}\sum_{y=1}^{L}(Lxy - Rxy) \times (Lxy - Rxy);$$

wherein Vp is the difference value of the pixel values; H is the number of rows of all overlapping pixels in the block-matching optimal position, L is the number of columns of all overlapping pixels in the block-matching optimal position, Lxy is the pixel value of the pixel at row x and column y of the first source image, and Rxy is the pixel value of the pixel at row x and column y of the second source image.

7. The method according to claim 1, wherein after the obtainment of the first source image and the second source image to be stitched, the method further comprises:
converting the first source image and second source image into images in the HSV format, the pixel difference value being the hue difference value.

8. The method according to claim 5, wherein after the obtainment of the first source image and the second source image to be stitched, the method further comprises:

computing the hue difference value and the gradient difference value of all pixels in the first source image and the second source image; and computing the sum value of the hue difference value and gradient difference value of all pixels, and selecting the pixels corresponding to the minimum sum value as the seam position.

9. The method according to claim 8, wherein the stitching of the first source image and the second source image according to the optimal block-matching position comprises:

stitching the first source image and the second source image in the pixel-matching optimal position according to the seam position.

10. The method according to claim 9, wherein the stitching of the first source image and the second source image in the pixel-matching optimal position according to the seam position comprises:

in the regions between the seam position and the pixel-matching optimal position, selecting pixels corresponding to the first source image and the second source image, respectively, for the stitching; and along the seam position, using linear blending to stitch pixels corresponding to the first source image and the second source image, in order to complete the stitching of the first source image and the second source image.

11. The method according to claim 8, wherein before the stitching of the first source image and the second source image according to the block-matching optimal position, the method further comprises:

converting the format of the first source image and the second source image to YCrCb;

after the format conversion, computing the average of luminance values in the first source image and the second source image at the seam position with samples;

using the luminance average value to compute a plurality of exposure factors in the pixel-matching optimal position between the first source image and the second source image; and using the plurality of exposure factors for exposure compensation for the first source image and the second source image, in order to balance the change in luminance in the pixel-matching optimal position between the first source image and the second source image.

12. The method according to claim 8, wherein before the computation of the hue difference value and the gradient difference value of all overlapping pixels in the first source image and the second source image in the pixel-matching optimal position, the method further comprises:

performing a downsampling operation on the first source image and the second source image.

13. The method according to claim 1, wherein after the obtainment of the first source image and the second source image to be stitched, the method further comprises:

performing a cylindrical projection on the first source image and the second source image in order to obtain the projected images of the first source image and the second source image.

14. The method according to claim 13, wherein the performance of a cylindrical projection on the first source image and the second source image comprises:

performing a cylindrical projection on the first source image and the second source image based on the pre-obtained shooting angles for the first source image and the second source image.

15. An image stitching apparatus, comprising:
a memory storing instructions; and
a processor configured to execute the instructions to:
obtain a first source image and a second source image;
select a first search region from the first source image and a second search region from the second source image, the first search region and second search region at least partially overlapping with each other along a first direction;
divide each of the first and second search regions into a plurality of pixel blocks, the pixel blocks in the first and second search regions having equal sizes;
move the first source image and the second source image toward each other along the first direction using the pixel blocks as a step size, until each of the first and second search regions has been traversed;
after each movement, determine a pixel difference value representing a difference between all overlapping pixel blocks of the first search region and the second search region;
determine an optimal block-matching position for the first and second source images based on the pixel difference value; and
stitch the first and second source images according to the block-matching optimal position.

16. The apparatus according to claim 15, wherein the processor is further configured to execute the instructions to:
move the first source image and the second source image toward each other along a row direction of the pixel blocks;
after each movement, determine the pixel difference value by averaging block pixel difference values of all overlapping pixel blocks, each of the block pixel difference value being a difference between average pixel values of two overlapping pixel blocks.

17. The apparatus according to claim 16, wherein when the search regions in the first source image and the second source image are the same in size, the processor is further configured to execute the instructions to use the following formula to compute the average value of the block pixel difference values:

$$Vb = \frac{\sum_{i=1}^{M}\sum_{j=1}^{N}(Lij - Rij) \times (Lij - Rij)}{n \times M};$$

wherein Vb is the average value of the block pixel difference values, M is the number of rows of pixel blocks in the search regions, N is the number of columns of pixel blocks in the search regions, Lij is the average value of all pixel values in the pixel block at row i and column j of the first source image, Rij is the average value of all pixel values in the pixel block at row i and column j of the second source image, and n is the movement as measured by the number of pixel block columns.

18. The apparatus according to claim 16, wherein when the average value of the block pixel difference values is at its minimum, the processor is further configured to execute the instructions to take the relative position of the first source image and second source image as the block-matching optimal position.

19. The apparatus according to claim 16, wherein the processor is further configured to execute the instructions to:
move the first source image and the second source image toward each other along the row direction with the pixel as the step size in the block-matching optimal position, and compute the difference value of the pixel values of all overlapping pixels after each movement;

take the relative position of the first source image and second source image as the pixel-matching optimal position when the difference value of the pixel values is at its minimum; and stitch the first source image and the second source image according to the pixel-matching optimal position.

20. A non-transitory computer-readable storage medium storing instructions that, when executed by a processor, cause the processor to perform an image stitching method comprising:

obtaining a first source image and a second source image;

selecting a first search region from the first source image and a second search region from the second source image, the first search region and second search region at least partially overlapping with each other along a first direction;

dividing each of the first and second search regions into a plurality of pixel blocks, the pixel blocks in the first and second search regions having equal sizes;

moving the first source image and the second source image toward each other along the first direction using the pixel blocks as a step size, until each of the first and second search regions has been traversed;

after each movement, determining a pixel difference value representing a difference between all overlapping pixel blocks of the first search region and the second search region;

determining an optimal block-matching position for the first and second source images based on the pixel difference value; and stitching the first and second source images according to the block-matching optimal position.

* * * * *